United States Patent [19]
Todd

[11] 4,136,968
[45] Jan. 30, 1979

[54] MULTI-SCREW, CONTINUOUS, MATERIAL PROCESSING SYSTEMS

[75] Inventor: David B. Todd, Saginaw, Mich.

[73] Assignee: Baker Perkins Inc., Saginaw, Mich.

[21] Appl. No.: 819,227

[22] Filed: Jul. 27, 1977

Related U.S. Application Data

[63] Continuation-in-part of Ser. No. 636,030, Nov. 28, 1975, abandoned.

[51] Int. Cl.² ............................ B01F 7/02; B29B 1/10
[52] U.S. Cl. ....................................... 366/85; 425/204
[58] Field of Search .................... 366/83, 85, 84, 80, 366/82, 301, 300; 425/204, 207, 208

[56] References Cited

U.S. PATENT DOCUMENTS

| | | | |
|---|---|---|---|
| 2,488,189 | 11/1949 | Hanson | 366/77 |
| 3,114,171 | 12/1963 | Colombo | 366/85 |
| 3,407,438 | 10/1968 | Selbach | 366/85 |
| 3,630,689 | 12/1971 | Wheeler | 366/85 |
| 3,779,522 | 12/1973 | Loomans | 366/85 |

*Primary Examiner*—Robert W. Jenkins

*Attorney, Agent, or Firm*—Learman & McCulloch

[57] ABSTRACT

An improved system for treating material proceeding continuously through a processing barrel having at least twin interconnected cylinders with saddle portions of generally V cross section at the points of interconnection of the cylinders. Twin rotating parallel mixer shafts, co-axially mounted in the cylinders, have radially interwiping screw or paddle elements between a material charging inlet and a material discharging outlet which are configured to wipe the cylinders including the saddle portions. Sets of paddle elements, each of which includes a cylinder closing paddle, are provided on the shafts at a flow control station between the inlet and outlet, and a movable flow-controlling saddle or valve element is mounted with relation to the cylinder closing paddle sets in a position such that it can be moved from an opened position to a position to restrict or block flow past the sets of paddle elements. A vacuum vent port can be provided for degassing or like purposes in the barrel casing at the flow control station in a position in which its relationship with the elements is such as to avoid the flow of product out the port.

25 Claims, 10 Drawing Figures

MULTI-SCREW, CONTINUOUS, MATERIAL PROCESSING SYSTEMS

BACKGROUND OF THE INVENTION

This application is a continuation-in-part of my co-pending case Ser. No. 636,030 filed Nov. 28, 1975, now abandoned.

The preferred form of the invention relates particularly to twin screw continuous mixers of the type operated in a figure 8-shaped barrel which is heated to a material processing temperature and wherein distinct processing zones are provided between the material supply and downstream material discharge openings in the mixer. Such mixers are particularly used with various plastic resins and are of the type where the plastic resin enters a feed screw zone and is then forced into an intensive mixing zone where it is melted. In one application the improved mixer is utilized to charge chopped glass fibers to the molten plastic and to fold the fibers uniformly into the molten plastic prior to discharging the compounded glass reinforced plastic resin to a further processing system comprising a cross head extruder, a hot-cut pelletizer, a pellet quenching bath and a pellet drier. With a system wherein a controlled restriction of the type described herein is provided between the intensive mixing zone and the glass charging zone, glass concentrations of up to 60% have been successfully homogenously distributed and the molded plastic and the materials compounded have been molded into a variety of products with excellent results.

In the only prior art investigation conducted by applicant, the following listed patents were noted and they are accordingly made of record in the present case:

1,849,291
1,935,050
2,488,189
2,584,225
2,670,188
3,023,455
3,099,040
3,164,563
3,349,432
3,419,250
3,446,485
3,490,750
3,608,868
3,613,160
3,630,689
3,823,921

The following listed additional prior art was cited in applicant's parent case and are made of record:

2,615,199; 3,761,061; 3,779,522; 2,051,885(German).

One of the prime objects of the present invention is to provide an improved mixer construction which permits zone restriction in the barrel of a heavy, large capacity mixer without adding necessary thrust loads or requiring axial movement of the barrel with respect to the mixer shafts, and which permits venting in the zone restriction area.

Another object of the invention is to design an efficiently and reliably operating processor or mixer of the character described which permits external control of the degree to which material fills the barrel in various processing zones and external control of the amount of work energy imparted to the material in the various zones.

Still another object of the invention is to provide a construction in which a melt seal can be obtained between different barrel zones so that different desired conditions of vacuum or pressure can be easily maintained in these zones.

Still a further object of the invention is to provide a mixer having barrel flow restricting and controlling mechanism which does not permit the material to clog in the mechanism or degrade in dead spaces within the mechanism or barrel while, at the same time, using pressure within the mixing chamber to aid in sealing the movable saddle part.

Other objects and advantages of the invention will be pointed out specifically or will become apparent from the following description when it is considered in conjunction with the appended claims and the accompanying drawings.

Referring now more particularly to the accompanying drawings, it is to be understood that the mixer depicted is of the type illustrated in applicant's assignee's U.S. Pat. Nos. 3,195,868, 3,719,350 and 3,630,689 which are incorporated herein by reference. As these prior patents indicate, there is a material inlet opening O in the FIG. 8-shaped mixer barrel B at the right end of the machine, and the usual material discharge opening D (see FIG. 1) is provided at the left (downstream) end of mixer barrel B.

Figure 2:
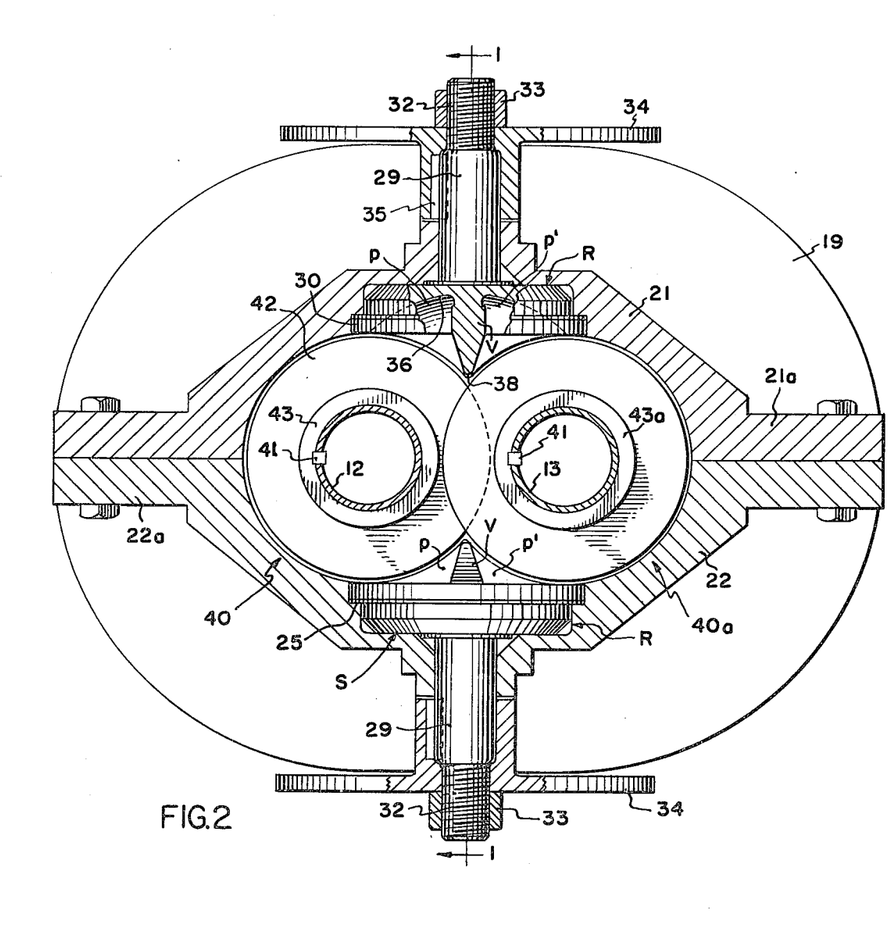
FIG. 2 is a transverse sectional view taken on the line 2—2 of FIG. 1.

The twin processing screw paddle members 10 and 11, which co-rotate in barrel B, may comprise configured worm sleeves 10a and 11a of lenticular transverse cross-section mounted on shafts 12 and 13 respectively or may be formed integrally on the shafts. Shafts 12 and 13 are journaled for rotation preferably in the same direction of rotation, and are driven at the same speed, in the manner indicated in the mentioned assignee's patents. The sleeves 10a and 11a provide co-wiping sections which also wipe the entire peripheral surface of the FIG. 8-shaped barrel B and may be keyed to the shafts 12 and 13 in any suitable manner. Alternatively, the screw sleeves 10 and 11 may be of the configuration shown in the present assignee's recently granted U.S. Pat. No. 3,900,187, or may comprise mating or matching axially abutting, helically arranged, paddles of lenticular shape displaced 90° one to the other.

Figure 1:
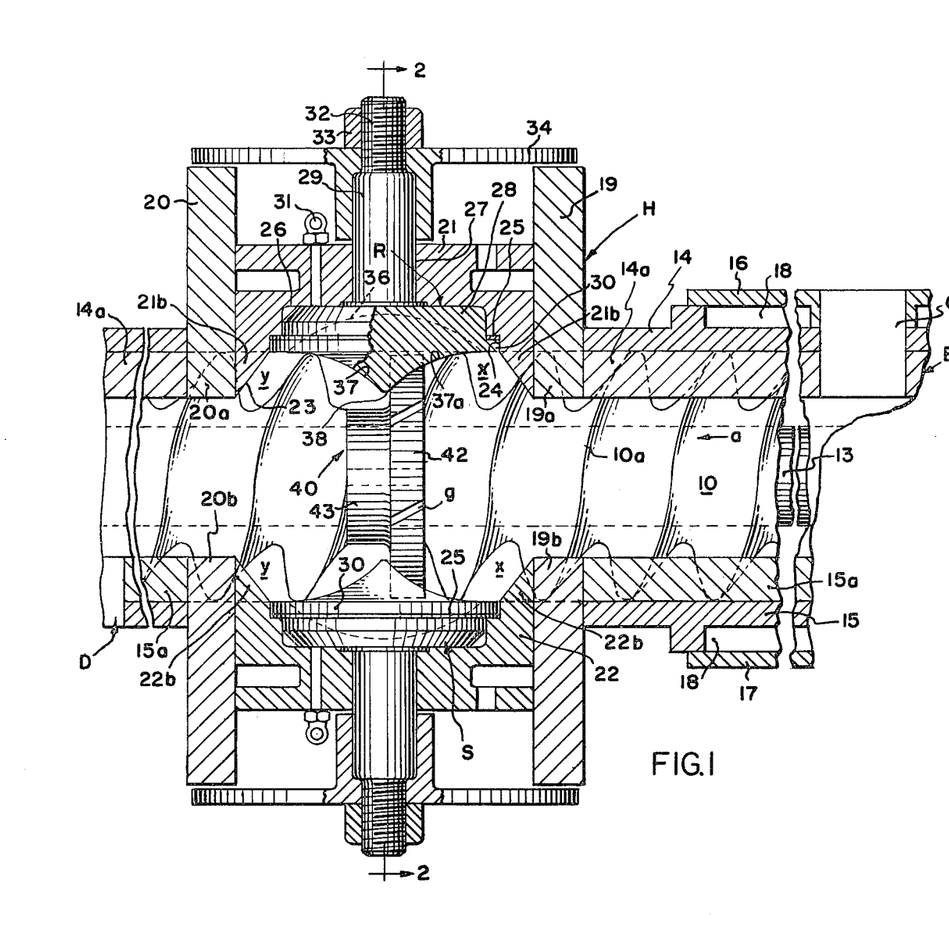
FIG. 1 is a fragmentary, sectional elevational view of a continuous processing machine with the selectively positioned saddle parts shown in a position to permit flow, the view being taken on line 1—1 of FIG. 2.

As FIG. 1 particularly indicates, the barrel B is preferably formed of two vertically separable barrel sections (see the present assignee's Loomans U.S. Pat. No. 3,195,868), 14 and 15 which have generally V-shaped saddle portions 14a and 15A. It will be noted that each of the barrel sections 14 and 15 is jacketed as at 16 and 17 respectively, to provide a space for circulating heating fluid which brings the barrel B to a temperature at which the plastic resin or other material which is being introduced will melt. Alternatively, in some processing applications, it may be desirable to circulate a cooling fluid through the jacketing spaces 18.

Provided intermediate the barrel B, and dividing it into a plurality of sections in the embodiment illustrated, is a restriction zone defining housing, generally designated H (FIG. 1), which includes end walls 19 and 20 with upper and lower barrel defining sections 21 and 22 respectively therein. As FIG. 3 notes, the sections 21 and 22 have flange portions 21a and 22a which may be releasably bolted or otherwise secured together, or at one side, a hinge could be provided instead so that the portion 21 could be simply swung upwardly with the barrel section 14, to permit access to the interior of the barrel and the screws 10 and 11. Each of the sections 21 and 22 similarly has saddle portions 21b and 22b, respectively, which correspond to the V-shaped saddle sections 14a and 15a, and similar V-shaped saddle sections 19a and 19b and 20a and 20b are provided at the upper and lower ends of housing end walls 19 and 20, respectively. Thus, the walls 19 and 20 and sections 21 and 22 comprise barrel continuations and have the same FIG. 8-shaped bores (interconnected cylinders) as barrel B.

The sections 21 and 22 are cut away to provide configured recesses R for rotatable saddle parts S, the sections 21b and 22b in this embodiment being cut away annularly as shown at 23. The portions 21 and 22 are further annularly recessed as at 24 to provide a rotary bearing within which a bearing ring 25, formed of a suitable bearing material, is disposed. Additionally, the recesses R, formed in the portions 21 and 22 have annular portions 26 and 27, as shown, and the bell-shaped head portion 28 of each rotatable saddle part is accommodated in portion 26 and has a projecting post part 29 which extends out through opening 27. Each saddle part S includes an annular flange 30, which is received in recessed portion 24 and bears against a bearing ring 25 and it will be seen that fittings 31 can be provided to permit a lubricant to be provided to the recessed portion 26. O-rings (not shown) may be provided to seal the upper and lower ends of shaft extensions 29 with respect to housing 21 to prevent the escape of lubricant.

The upper end of each saddle part post 29 is threaded as at 32 to permit it to be secured in a given rotary position. As FIG. 3 particularly indicates, a handle 34, which may be keyed (as at 35), or otherwise suitably secured, to each post 29, can be manipulated to turn the saddle part S and adjust its rotary position. Nut 33 is provided to hold handle 34 on.

Figure 1A:
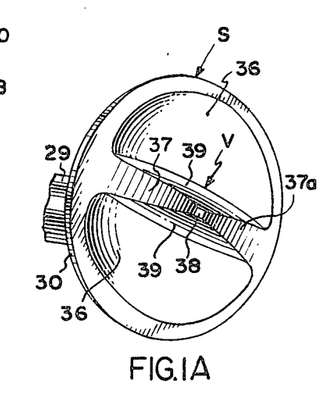
FIG. 1A is a perspective under plan view of one of the saddle parts.

As FIG. 1 particularly indicates, the bell-shaped head portion 28 of each saddle part S is dished out as at 36, and it will be noted (see particularly FIG. 1A) that this otherwise symmetric sphericity is broken by a central vane, generally designated V, which bisects the dished portion, and that the vane is of V, or saddle, shape (see particularly FIG. 1) and includes converging radial surfaces 37 and 37a connecting with a frustrum surface 38. Surfaces 37 and 37a conform to the circular configuration of the barrel twin intersecting cylinders. The side wall surfaces 39 of the vane V are also shown as converging slightly in a direction toward the frustrum surface 38.

Provided on the shafts 12 and 13 are co-wiping bore closure elements, generally designated 40 and 40a, which may be keyed to the shafts 12 and 13 as with keys 41 (see FIG. 2). The cooperating paddle units 40 and 40a have enlarged circular paddle discs 42 and 42a respectively and reduced paddle disc portions 43 and 43a, respectively. The paddles 42 and 42a are of a diameter to close and wipe the cylindrical portions of the barrel sections 21–22 in which they rotate and the reduced diameter annular sections 43 and 43a cooperate with the sections 42a and 42 respectively to together provide pairs of co-wiping surfaces which axially close off the barrel B. Helical material forwarding grooves g may be provided in the peripheries of paddles 42 and 42a as shown.

THE OPERATION

Figure 3:
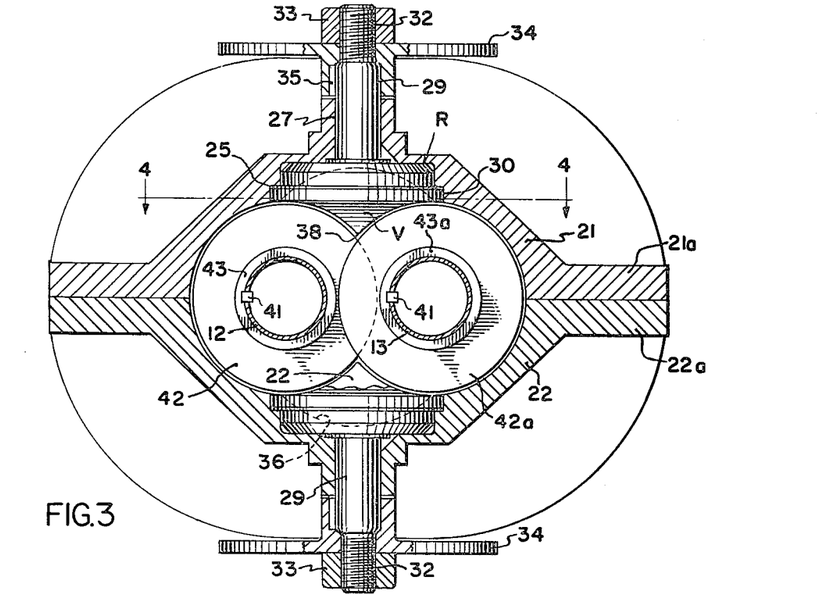
FIG. 3 is a view similar to FIG. 2, but showing the saddle parts adjusted to block flow.
Figure 4:
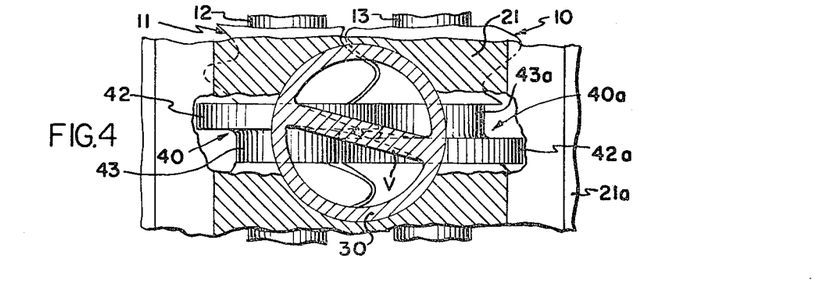
FIG. 4 is a fragmentary, sectional plan view taken on the line 4—4 of FIG. 3.

In operation, the material to be processed is supplied to the interior of the FIG. 8-shaped barrel B via openings O, and, as it is moved forwardly in the direction a (FIG. 1) by the co-rotating and co-wiping screw sections 10 and 11, its temperature is elevated to a melting temperature. When the vanes V are in the position shown in FIGS. 2 and 5, the material being processed through barrel B can proceed through the passages p and p' (FIG. 2) on either side of the vanes V via the bypass provided by saddle part surface 36 from the location x (see FIG. 1) in barrel B to the location y. Typically, the size of passages p and p' at the upper and lower ends of the mixer are together such that flow is substantially unimpeded when the vanes V are in the position shown in FIGS. 2 and 5. When the vanes V are revolved slightly less than 90° and the surfaces 37 and 37a substantially engage the peripheries of the greater diameter discs 42 and 42a, flow is blocked (FIG. 3 and 4).

Figure 5:
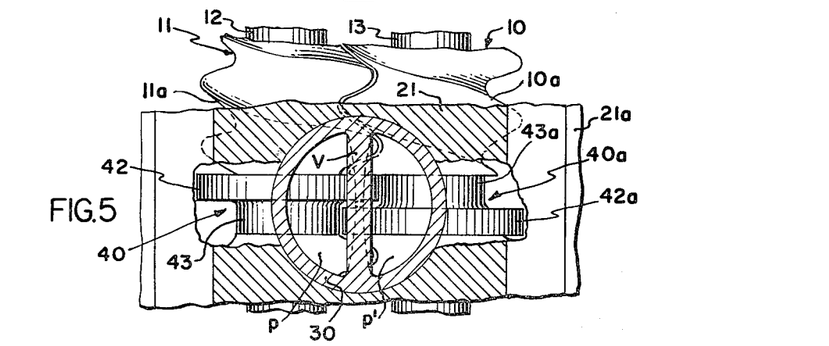
FIG. 5 is a like view, but with the saddle part rotated to a position in which full flow is permitted.

For many reasons it may be desirable to adjust the rotary position of the vane V at either or both the top or bottom of the machine by rotating the saddle part S from the position shown in FIGS. 2 and 5 to some other position. This may be accomplished by simply turning the handle 34. Plainly, fine tuning of the volume of material proceeding from location x to location y in the sense of holdback of the material being processed (and thereby the amount of energy input to the material) may be very readily and efficiently accomplished in this manner and different pressure or vacuum conditions can be maintained in the x and y portions of the barrel downstream and upstream of the saddle part S to suit desired processing conditions.

Figure 6:
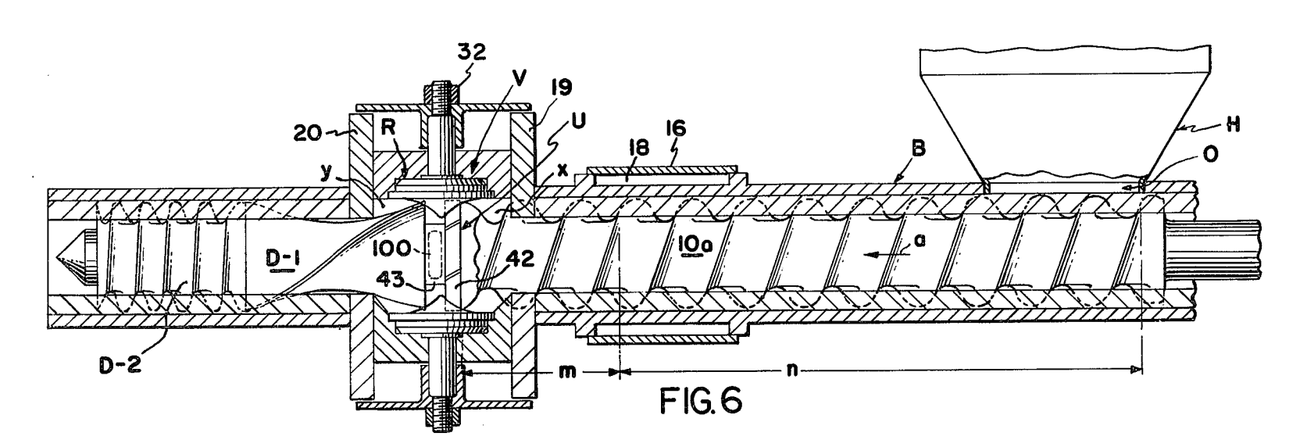
FIG. 6 is a fragmentary sectional side elevational view of a modified form of continuous material processing machine.
Figure 7:
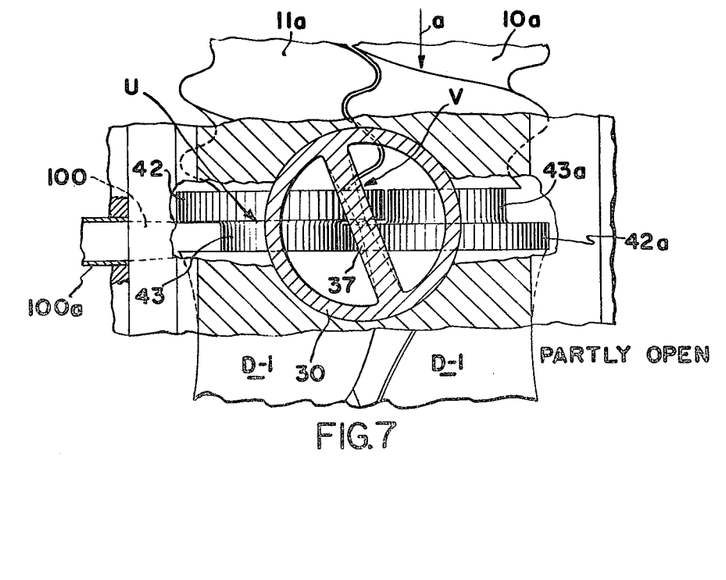
FIG. 7 is a view of the modified machine similar to FIG. 5 but with the saddle part in partly open position.

In FIGS. 6 and 7, an alternative embodiment of the invention is disclosed in which vacuum venting or degassing is possible at a degassing station designated U. For example, polybutane H300 with a viscosity of 335 to 500 poises at an operating temperature range in the 93 to 102° F. area, and including entrained air, can be degassed satisfactorily utilizing vacuum on the leeside of the barrel valve V. The entrapped air can be removed at the vent 100, which preferably is in the slot shape shown, to obtain a more stable and bubble-free polymer. The barrel valve, if not fully open, must be opened "forwardly" in the sense of the pitch of the forwarding screws 10a–11a and their common direction of rotation because, if opened backwardly, it will function as a plow and actually move the material into the vent port 100. Typically speaking, the controlled feed of material into the barrel B is sufficient to fill it ¾ full of material at the supply hopper H end, depending of course on the material and its viscosity, and good control of the flow of material is achieved by opening the barrel valve V to greater or lesser degrees.

In studies which were undertaken with corn syrup and when the vacuum at the vent 100 was kept below 15 inches of mercury, the vent stayed clear of syrup and significant deaeration of the product was accomplished. The partial rotation of the central element V to the position shown in FIG. 7 permits the vane 37 to cooperate with the elements 42, 43a and 42a, 43 to direct material away from the vent 100.

In the embodiment of the invention disclosed the same numerals have been used as previously to indicate like parts. As FIG. 6 indicates, the screws at the flow control station U, which includes the elements 42–43a, 42a–43, and V, may take the form of mating greater conveying capacity sections D-1 and, downstream thereof, mating end discharge sections D-2. The sections D-1 are configured to have a capacity to operate in a partly starved (non-full) condition while the end discharge sections D-2 are configured so as to operate fully loaded with material. Typically the flow control V is adjusted angularly to provide a barrel section m immediately rearward of the station U in which the material backs up and which is operated full of material while an upstream section n is only partly loaded during operation. The section m achieves the melt seal which prevents a vacuum source attached to the vacuum pipe 100a at vent 100 from sucking air and material in from the feed hopper H. The barrel portion at element 43a, and housing screws D-1, operates partly full so that suction venting is possible. With adjustment of element V, a positive discharge pressure can be achieved at D-2 where this is necessary while venting upstream, which means that the immediately subsequent processing equipment downstream can be pressure fed and need not incorporate a vacuum venting station. The helix angle of screws D-2 is tight enough, dependent on the material being processed, to have the capability of pumping the material up from vacuum or moving it under positive pressure to a die or suitable forwarding device.

Figure 8:
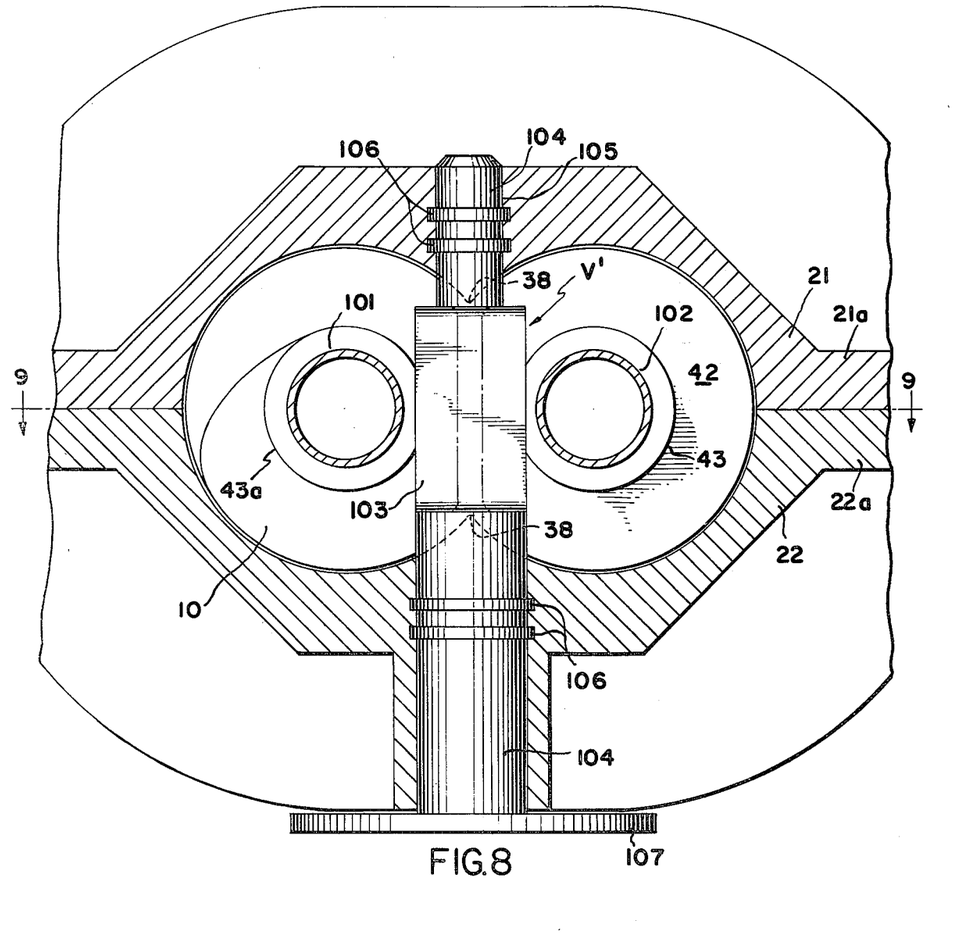
FIG. 8 is a transverse sectional view of a still further modification of the invention, the flow control element being shown in open position.
Figure 9:
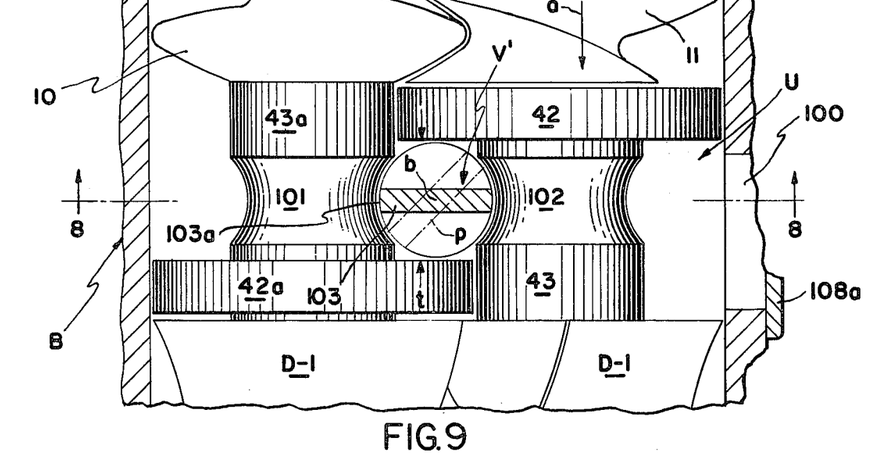
FIG. 9 is a cross-sectional view taken on the line 9—9 in FIG. 8.

In FIGS. 8 and 9, another embodiment of the invention is illustrated in which the valve V', which is utilized is similar but does not in effect form a barrel bypass. In this embodiment of the invention, parts used in previous embodiments have been given like numbers and only the different parts have been differentiated, for purposes of more clearly pointing out the invention. For instance the forwarding screws are shown at 10 and 11 as screws which are rotated in a direction to advance the material in the direction a. The upstream full bore paddle is shown at 42 and the downstream full bore paddle is shown at 42a, but this time in a sidewisely reversed relationship and located a spaced distance t from one another. The reduced diameter paddles of circular shape, 43 and 43a, are shown as elongated and having diametrically opposite grooves 101 and 102 of curvate configuration. Provided in the space t that is created, to rotated about an axis b, is a plate 103 having curvate edges 103a complementary to the configuration of grooves of 101 and 102. Plate 103 is supported upon a rotatable shaft 104 rotating about the axis b in a bearing opening 105 provided in the barrel B. Seal rings 106 are preferably provided, as is handle 107 which may be manually grasped to adjust the position of plate valve 103. As FIG. 8 indicates, the plate 103 spans the distances between the upper and lower saddle portions 38 of the barrel B, and when in the position indicated by the broken lines in FIG. 9, effectively prevents flow through the barrel B. By virtue of the fact that it substantially spans the distance t between the upstream and downstream full bore circular paddles 42 and 42a, except for an operating clearance, the melt seal obtained is such at this point as to prevent flow for practical purposes when the plate 103 is turned to the position as indicated in broken lines in FIG. 9. Of course, intermediate positions of the plate 103 are possible to control the restriction in the manner desired. When the device is turned to the particular 45° position indicated by the lines p, or some position in the 90° between the solid line position and the other broken line (closed) position, the vacuum vent 100, which has a removable cover 100a, can be opened and degassing can occur.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What is claimed is:

1. In a continuous processor having: a longitudinally extending barrel housing, with a material supply opening and a downstream discharge opening, configured to form an axially extending processing barrel with at least twin interconnected cylinders therein and wherein the distance between the axes of the twin cylinders is substantially equal to or less than twice the radius of the cylinders and the housing has saddle portions of generally V cross section at the points of interconnection of the cylinders; and at least a pair of parallel longitudinally extending rotatable shafts with radially intercooperating material forwarding portions thereon configured to wipe the cylinders including the saddle portions, the improvement comprising: radially adjacent pairs of co-wiping elements on said shafts downstream from the material supply opening at a flow control station, the co-wiping elements of each pair being received in different cylinders, one element of each pair being of full bore shape to substantially block flow through one of the cylinders by leaving only wiping clearance between the said element and cylinder, and the other element of each pair being of reduced size and permitting flow through the cylinder in which it is disposed adjacent its periphery, the first element of one pair being axially displaced from the said first element of the other pair and located in axially staggered position with respect to it on a different shaft, and each being located radially opposite the said second element on the other shaft in co-wiping relationship therewith; the second element of one pair also being located in axially staggered relation with respect to the second element of the other pair; and a movable flow restricting part, disposed to interact with said elements at the flow restricting station to tend to back up the flow, and mounted to move toward and away from a position in which it permits less restricted flow; the barrel having a degassing vent opening therein radially downstream from the location where the flow restricting part tends to back up the flow of material.

2. The processor of claim 1 wherein co-wiping, mating, material handling elements are on said shafts at the flow restricting station downstream from said co-wiping elements and have a greater volumetric capacity than said material forwarding portions.

3. The processor of claim 2 wherein said latter elements comprise screws.

4. The process of claim 1 wherein said flow controlling part comprises a vane disposed biased to the axes of the shafts at an angle relative to the vent to tend to direct material away from the vent.

5. The processor of claim 1 wherein the vent is substantially radially adjacent one of the reduced size elements downstream from the location where the flow restricting part tends to back up the flow of material so that this portion of the barrel is not filled with material and material is not wiped across the vent opening.

6. The processor of claim 5 wherein the flow restricting part comprises a dished member inset into one of the saddle portions in a position to provide by-pass past the section of the barrel in which said pairs of elements are located and having a chamber defined in part by a wall disposed to tend to substantially bridge the full bore elements when the part is in a more closed position, the said chamber being of such extend as to extend downstream beyond said pairs of elements to by-pass material past them when the restriction controlling part is moved to a more open position.

7. The processor of claim 6 wherein the said wall is a central wall separating the dished member into two chambers which when the wall is parallel to the axes of the shafts extend upstream and downstream beyond said pairs of elements.

8. In a continuous processor having: a longitudinally extending barrel housing, with a material supply opening and a downstream discharge opening, configured to form an axially extending processing barrel with at least twin interconnected cylinders therein and wherein the distance between the axes of the twin cylinders is substantially equal to or less than twice the radius of the cylinders and the housing has saddle portions of generally V cross section at the points of interconnection of the cylinders; and at least a pair of parallel longitudinally extending rotatable shafts with material forwarding portions thereon configured to wipe the cylinders including the saddle portions, the improvement comprising: radially adjacent pairs of co-wiping elements on said shafts downstream from the material supply opening at a flow restricting station, the co-wiping elements of each pair being received in different cylinders, one element of each pair being of full bore shape to block flow through one of the cylinders by leaving only wiping clearance between the said element and cylinder and axially spaced from the like element of the other pair, and the other element of each pair being of reduced size and permitting flow through the cylinder in which it is disposed adjacent its periphery, the first element of one pair being axially displaced from the said first element of the other pair and located in axially staggered position with respect to it on a different shaft, and each being located radially opposite the second element on the other shaft in cowiping relationship therewith; the second element of one pair also being located in axially staggered relation with respect to the second element of the other pair; and a rotatable flow restricting vane in the space between said full bore elements, disposed to interact with said pairs of elements at the flow restrict station to partly bridge the space between said full bore elements and back up the flow and, mounted to move toward and away from a position in which it permits less restricted flow; the barrel having a degassing vent opening therein radially downstream from the location where the flow restricting part backs up the flow of material.

9. The processor of claim 8 wherein the vent opening is radially adjacent the downstream reduced size element, downstream from the location where the vane backs up the flow of material.

10. In a continuous process having: a longitudinally extending barrel housing, with a material supply device and a downstream discharge opening, configured to form an axially extending processing barrel with at least twin interconnected cylinders therein and wherein the distance between the axes of the twin cylinders is substantially equal to or less than twice the radius of the cylinders and the housing has saddle portions of generally V cross section at the points of interconnection of the cylinders; and at least a pair of parallel longitudinally extending rotatable shafts with radially intercooperating material forwarding portions thereon, the improvement comprising: radially adjacent co-wiping flow control elements on said shafts downstream from the material supply opening at a flow control station; and a movable flow restricting part at said station disposed to interact with said flow control elements to back up the flow and permit less than full barrel flow downstream mounted to move toward and away from a position in which it permits less restricted flow, the barrel having a degassing vent opening therein downstream from the location where the flow restricting part commenced to back up the flow of material.

11. In a continuous processor having: a longitudinally extending barrel housing, with a material supply opening and a downstream discharge opening, configured to form an axially extending processing barrel with at least twin interconnected cylinders therein and wherein the distance between the axes of the twin cylinders is substantially equal to or less than twice the radius of the cylinders and the housing has saddle portions of generally V cross section at the points of interconnection of the cylinders; and at least a pair of parallel longitudinally extending rotatable shafts with radially intercooperating material advancing portions thereon, the improvement comprising: radially adjacent pairs of co-wiping elements on said shafts downstream from the material supply opening, the co-wiping elements of each pair being received in different cylinders, one element of each pair being of full bore shape to block flow through one of the cylinders by leaving only wiping clearance between the said element and cylinder and axially spaced from the like element of the other pair, and the other element of each pair being of reduced size and permitting flow through the cylinder in which it is disposed adjacent its periphery, the first element of one pair being axially displaced from the said first element of the other pair and located in axially staggered position with respect to it on a different shaft, and each being located radially opposite the said second element on the other shaft in co-wiping relationship therewith; the second element of one pair also being located in axially staggered relation with respect to the second element of the other pair; and a movable flow restricting plate, disposed in the space between said full bore elements substantially centrally between the axes of the shafts, pivotally mounted to move to a first position with respect to said elements parallel to the axes of said shafts to bridge the space between said full bore elements and substantially block flow past the pair of elements, and away from said first position to an axially biased position in which it permits less restricted flow.

12. In a continuous processor having: a housing, with a material supply opening and a downstream discharge opening configured to form an axially extending processing barrel with at least twin interconnected cylinders therein and wherein the distance between the axes of the twin cylinders is equal to or less than twice the radius of the cylinders and the housing has saddle portions of generally V cross section at the points of interconnection of the cylinders; and at least a pair of parallel rotatable shafts with radially interwiping portions thereon configured to wipe the cylinders including the saddle portions, the improvement comprising: at least a pair of axially abutting elements on each shaft and received in each cylinder configured to substantially block flow through said cylinders at a location downstream from the material supply opening, one first element of each pair being of a size and shape to substantially block flow through the cylinder by leaving only a wiping clearance between the said element and cylinder, and the other element being of reduced size and permitting flow through the cylinder in which it is disposed around its periphery, the reduced sized element of one pair being axially displaced from the reduced sized element of the other pair and located on a different shaft, and each reduced sized element being located radially opposite the said first element on the other shaft in co-wiping relationship therewith; and a rotatable, flow restricting, by-passage providing saddle part disposed adjacent said pairs of elements and substantially centrally between the axes of the shafts having a vane portion which is mounted to rotate toward axially displaced peripheral surfaces of the said first elements to substantially bridge them and substantially block by-passage flow around the peripheries thereof, and rotate away therefrom to a position in which it permits less restricted axial flow past said saddle part.

13. The apparatus as set forth in claim 12 in which a pair of identical and opposite saddle parts are provided; and means is provided for independently adjusting the position of each.

14. The apparatus as set forth in claim 12 in which said housing is formed to provide bypass space with a rotary bearing surface and said saddle part is formed to provide a bypass on either side of said vane portion, said saddle part being mounted for rotation with respect to said bearing surface.

15. The apparatus as set forth in claim 14 in which said saddle part has a post extending out through said housing and handle means is provided thereon which can be grasped to adjust the rotary position of the saddle part.

16. The apparatus as set forth in claim 14 in which said saddle part comprises a generally bell-shaped portion with a dished recess having said vane extending diametrally across it, the vane having an apex bounded by marginal radial walls curved generally to the configuration of the cylinder saddle portions and the said first elements; and having vane side wall surfaces converging to said apex.

17. The improved apparatus of claim 16 wherein said generally bell-shaped portion has a circumferentially projecting flange and a bearing is received between said bearing surface and flange.

18. In a continuous processor having: a housing, with a material supply opening and a downstream discharge opening configured to form an axially extending processing barrel with at least twin interconnected cylinders therein so that the housing has saddle portions of generally V cross section at the points of interconnection of the cylinders; and at least a pair of parallel rotatable shafts with radially interwiping portions thereon configured to wipe the cylinders including the saddle portions, the improvement comprising: a paddle element on each shaft and received in each cylinder configured to substantially block flow through said cylinders at a location downstream from the material supply opening, and a rotatable flow restricting saddle part disposed adjacent said elements and centrally between the axes of the shafts having vane means which is mounted to rotate toward the peripheral surfaces of the elements to substantially block flow around the peripheries thereof and rotate away therefrom to a position in which it permits less restricted axial flow past said saddle part.

19. The apparatus as set forth in claim 18 in which each paddle element is circular and has helical peripheral grooves configured with respect to the direction of rotation to advance material.

20. In a continuous processor having: a longitudinally extending barrel housing, with a material supply opening and a downstream discharge opening configured to form an axially extending processing barrel with at least twin interconnected cylinders therein and wherein the distance between the axes of the twin cylinders is substantially equal to or less than twice the radius of the cylinders and the housing has saddle portions of generally V cross section at the points of interconnection of the cylinders; and at least a pair of longitudinally extending parallel rotatable shafts with material advancing portions thereon, the improvement comprising: radially adjacent pairs of co-wiping elements on said shafts downstream from the material supply opening, elements of each pair being received in different cylinders, one first element of each pair being of a size and circular shape to block flow through the cylinder by leaving only wiping clearance between the said element and cylinder, and the second element of each pair being of reduced size and permitting flow through the cylinder in which it is disposed around its periphery, the said first element of one pair being axially displaced from the said first element of the other pair and located on a different shaft, and each being located radially opposite the said second element on the other shaft; the housing having a movable saddle-like part with a flow restricting vane portion disposed adjacent said pairs of elements generally centrally between the axes of the shafts, and the housing and part being formed to provide an axial flow bypass past said cylinder blocking elements, with the vane portion mounted to move to a first biased position relative to a longitudinal plane parallel to the axes of said shafts to substantially engage and bridge longitudinally displaced peripheral surfaces of the said first elements to substantially block flow, and away from said first position to a position in which it permits less restricted flow past said part.

21. The improved apparatus as set forth in claim 20 wherein the saddle-like part is mounted for rotation to rotate said vane about an axis generally perpendicular to the axes of the shafts.

22. The improved apparatus of claim 20 wherein the saddle-like part is recessed to provide bypasses on both sides of said vane portion neither of which is of an extent to bridge and extend beyond said first elements of the pairs when the vane is in said first position but which do extend upstream and downstream of said pairs of elements when the part is moved toward a position more parallel with the axes of said shafts.

23. In a continuous processor having: a longitudinally extending barrel housing, with a material supply opening and a downstream discharge opening configured to form an axially extending processing barrel with at least twin interconnected cylinders therein and wherein the distance between the axes of the twin cylinders is substantially equal to or less than twice the radius of the cylinders and the housing has saddle portions of generally V cross section at the points of interconnection of the cylinders; and at least a pair of parallel longitudinally extending rotatable shafts with material advancing portions thereon, the improvement comprising: radially adjacent pairs of co-wiping elements on said shafts downstream from the material supply opening the co-wiping elements of each pair being received in different cylinders, one element of each pair being of a size and circular shape to block flow through one of the cylinders by leaving only wiping clearance between the said element and cylinder, and the other element of each pair being of reduced size and permitting flow through the cylinder in which it is disposed adjacent its periphery, the first element of one pair being axially displaced from the said first element of the other pair and located in axially staggered position with respect to it on a different shaft, and each being located radially opposite the said second element on the other shaft in co-wiping relationship therewith; the second element of one pair also being located in axially staggered relation with respect to the second element of the other pair; and a movable flow restricting part, disposed substantially longitudinally centrally with relation to said parts of elements and substantially centrally between the axes of the shafts, mounted to move to a first position with respect to said elements to substantially block flow past the pairs of elements, and away from said first position to a position in which it permits less restricted flow.

24. The apparatus as set forth in claim 23 in which said flow restricting part is mounted for rotation.

25. The apparatus as set forth in claim 24 in which said part is mounted on a shaft extending through a housing section part of the barrel housing which has handle means mounted thereon to permit manual actuation of the shaft.

* * * * *

UNITED STATES PATENT AND TRADEMARK OFFICE
CERTIFICATE OF CORRECTION

PATENT NO. : 4,136,968
DATED : January 30, 1979
INVENTOR(S) : David B. Todd

It is certified that error appears in the above-identified patent and that said Letters Patent are hereby corrected as shown below:

Column 1, line 58, change "necessary" to --unnecessary--.

Column 7, line 10, change "process" to --processor--.

Column 7, line 27, change "extend as" to --extent as--.

Column 8, line 35, change "commenced" to --commences--.

Column 12, line 13, change "parts" to --pairs--.

Signed and Sealed this

Twenty-fourth Day of April 1979

[SEAL]

Attest:

RUTH C. MASON
Attesting Officer

DONALD W. BANNER
Commissioner of Patents and Trademarks